June 19, 1951  J. JOHNSON  2,557,226
BEATER CYLINDER FOR COMBINES AND THE LIKE
Filed March 15, 1949  2 Sheets-Sheet 1
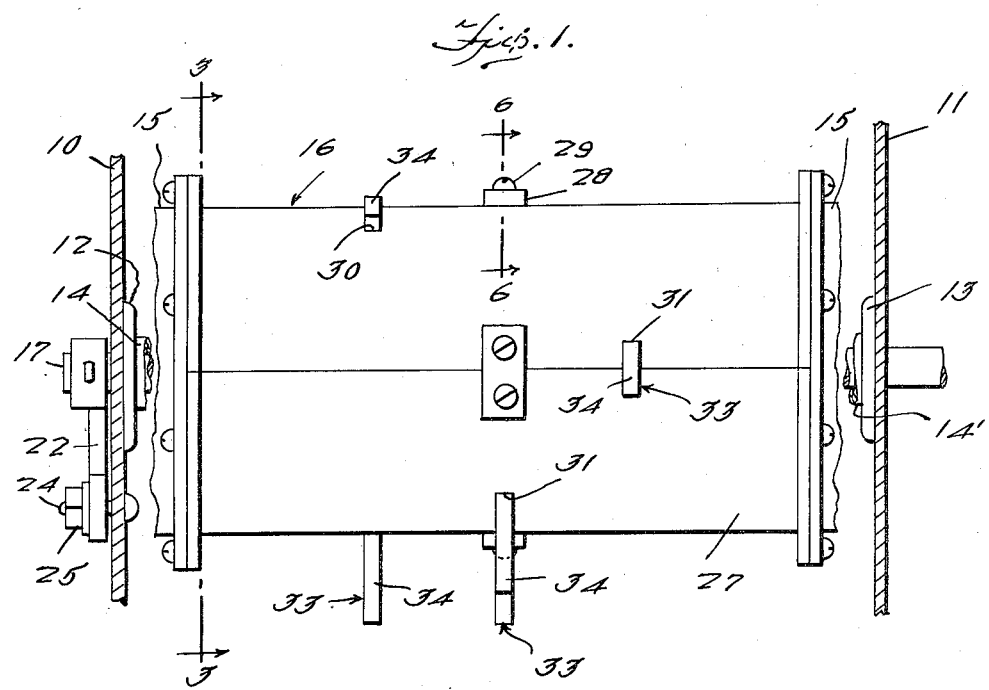
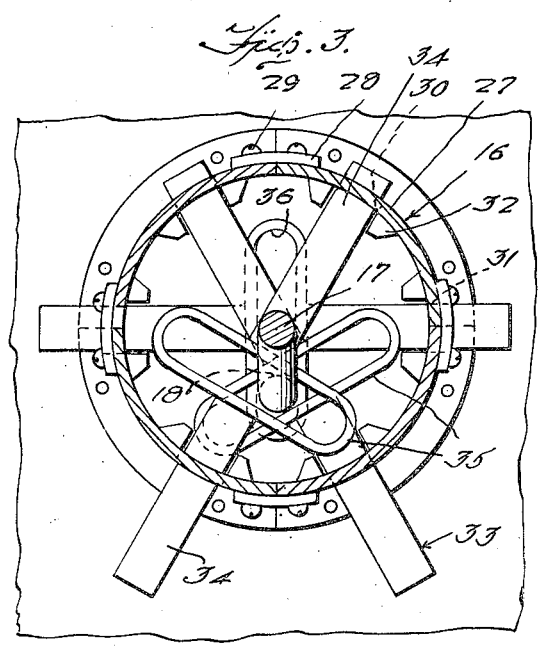
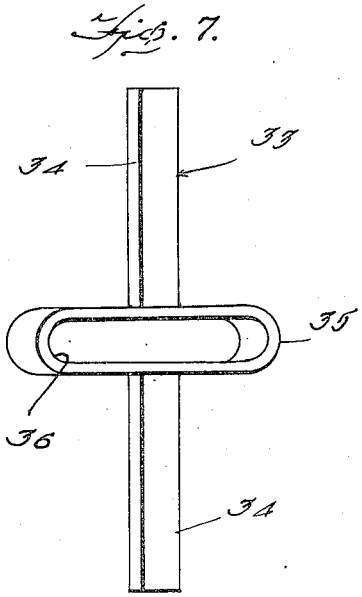
INVENTOR.
John Johnson
BY
McMorrow, Berman + Davidson
ATTORNEYS June 19, 1951  J. JOHNSON  2,557,226
BEATER CYLINDER FOR COMBINES AND THE LIKE
Filed March 15, 1949  2 Sheets-Sheet 2
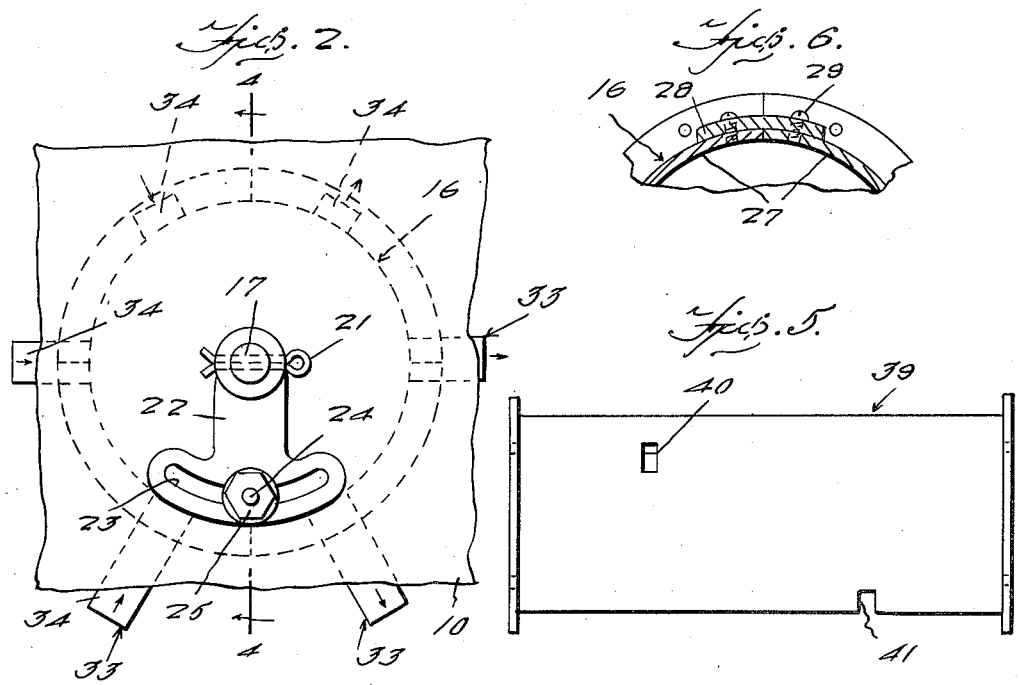
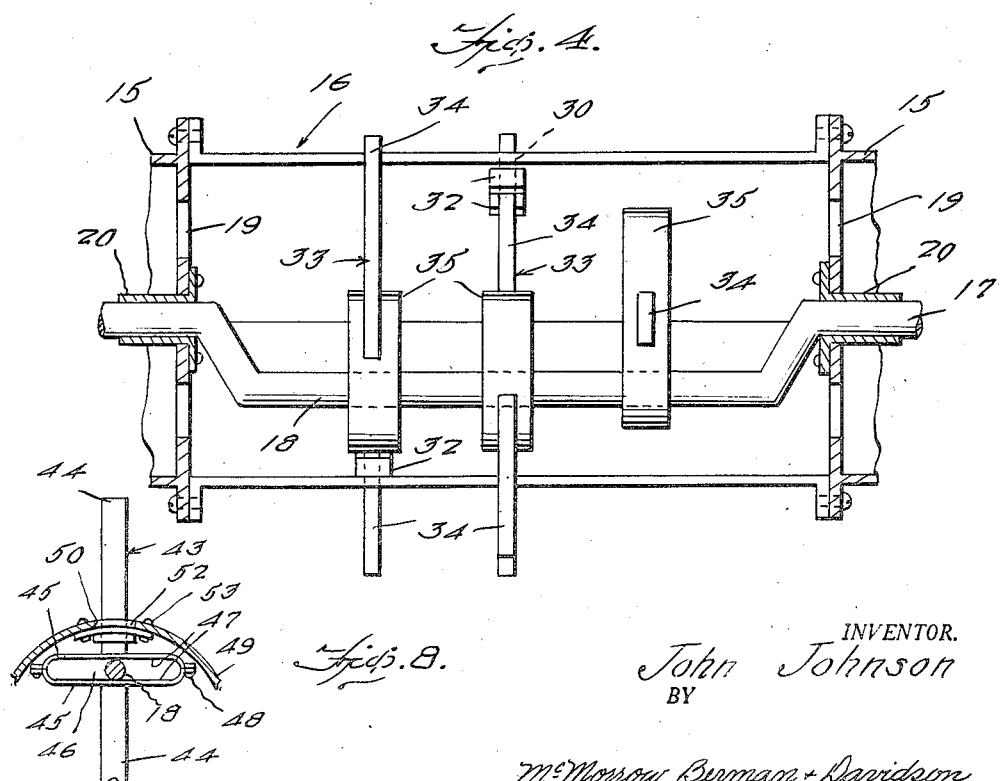
INVENTOR.
John Johnson
BY
McMorrow, Berman & Davidson
ATTORNEYS Patented June 19, 1951

2,557,226

UNITED STATES PATENT OFFICE 2,557,226

BEATER CYLINDER FOR COMBINES AND THE LIKE

John Johnson, Brockton, Mont.

Application March 15, 1949, Serial No. 81,457

2 Claims. (Cl. 130—27)

Combines, threshing machines and the like usually include a rotating beater cylinder which is provided with a plurality of beater fingers which are alternately projected and retracted outwardly of the cylinder so as to spread the straw laterally of the cylinder to prevent clogging. The beater fingers aforesaid are projected during that portion of each revolution of the cylinder wherein it is desirable for the fingers to engage the straw and are thereafter retracted into the cylinder to disengage the fingers from the straw. In such prior devices, the beater fingers are projected and retracted with an oscillatory movement by suitable means inwardly of the cylinder to which the beater fingers are pivotally connected. This oscillatory movement requires that the slots in the cylinder wall through which the fingers project be elongated so as to permit the oscillation or rocking of the fingers as they are projected and retracted. I have found that such oversized or elongated slots are undesirable in that they permit the entry of chaff, grain or dirt to the interior of the cylinders, and also because they make the operation of the fingers substantially noisy.

With the foregoing in view, it is an object of my invention to provide an improved beater cylinder and beater fingers therefor of the class described.

A further object is to provide an improved beater cylinder and beater fingers therefor wherein the beater fingers are reciprocated in a straight line relative to the cylinder through slots formed in the cylinder and having a close sliding fit with each finger.

A further object is to provide an improved beater cylinder and beater fingers of the class described together with means for projecting and retracting each finger once during each revolution of the cylinder, and wherein the means for projecting the fingers is adjustable concentrically of the axis of the cylinder whereby to vary the phase of the fingers.

A further object is to provide in a device such as that last described means for rigidly connecting pairs of fingers together with the fingers of each pair extending in opposite directions and parallel so as to be guided for reciprocation in substantially oppositely-disposed pairs of holes or slots formed in the cylinder wall.

Other objects and advantages reside in the particular structure of the device, the structure of the several elements forming the same, combinations and sub-combinations of such elements, all of which will be readily apparent to those skilled in the art upon reference to the attached drawing in connection with the following specification, wherein the invention is shown, described and claimed.

In the drawing:

Figure 1 is an elevation of a cylinder according to the invention;

Figure 2 is an end elevation thereof looking from the left of Figure 1;

Figure 3 is a transverse vertical sectional view taken substantially on the plane of the line 3—3 of Figure 1;

Figure 4 is a longitudinal vertical sectional view taken substantially on the plane of the line 4—4 of Figure 2, parts being omitted;

Figure 5 is a plan view of a modified form of the cylinder apart from the rest of the structure;

Figure 6 is a fragmentary transverse vertical sectional view taken substantially on the plane of the line 6—6 of Figure 1;

Figure 7 is a perspective view of one of the beater fingers apart from the rest of the structure;

Figure 8 is a fragmentary transverse vertical sectional view showing a modified form of the cylinder and beater finger.

Referring specifically to the drawing, wherein like reference characters have been used throughout the several views to designate like parts, and referring at first to the form of invention of Figures 1 to 7, inclusive, 10 and 11 designate generally a pair of laterally-spaced frame members on a combine or like machine which have mounted thereon any suitable bearings 12 and 13 for tubular stub shafts 14 and 14' of a pair of laterally-spaced but axially-aligned conveyor cylinders 15. The conveyor cylinders are conventional and form no part of the invention. However, the conveyor cylinders 15 have fixed thereto between the same a beater cylinder 16 according to the invention. Thus, the beater cylinder 16 rotates with the conveyor cylinders 15 by any suitable mechanism, not shown. It is to be understood that the conveyor cylinders 15 are not an essential part of the invention, as the cylinder 16 according to the invention is adapted to be mounted for powered rotation between any suitable frame members 10 and 11 of the combine.

A shaft 17 is disposed axially of the stub shafts 14 and 14'. An intermediate portion of of the shaft 17 is laterally offset in parallel relation to the axis of the cylinder 16 to provide a crank pin 18, Figure 4. As shown in Figure 4, the conveyor cylinders 15 may have their inner ends formed with spiders 19 mounting any suitable bearings 20 for the shaft 17 oppositely outwardly of the crank pin portion 18. One end of the crank shaft 17 extends outwardly of the support 10 and has fixed thereto in any suitable manner, as by the cotter pin 21, an adjusting arm 22. The outer end of the adjusting arm 22 is enlarged and formed with an arcuate slot 23 which is concentric to the axis of the shaft 17. The slot 23 receives a stud 24 fixed to the frame member 10. The outer end of the stud 24 is threaded for threaded engagement with a nut 25 whereby the adjusting arm 22 may be clamped to the frame member 10 to secure the crank pin 18 in an adjusted position concentrically of the axis of the cylinder 16. The purpose of this adjustment will be apparent hereinafter.

As best seen in Figures 1, 3 and 6, the cylinder 16 comprises a plurality of like arcuate segments 27 connected together in any suitable manner, as by the connector strips 28 and machine screws 29. Moreover, the cylindrical wall of the cylinder 16 is formed with a plurality of pairs of opposed holes 30 and 31 therethrough. In the embodiment illustrated, Figure 3, the holes 30 and 31 of each pair are diametrically opposite to each other, but it is obvious that they could be slightly offset if desired. The holes 30 and 31 are actually slots in the embodiment shown. The inner surface of the cylindrical wall of the cylinder 16 is formed with a pair of inwardly-directed lugs 32 at each end of the holes 30 and 31 to provide guides for beater fingers, now to be described.

The beater fingers 33 are best seen in Figure 7, and inasmuch as they are all identical in this form of the invention, it will suffice to describe but a single one of them. Thus, each beater finger comprises a one-piece structure comprising a pair of opposite end or beater finger portions 34 connected together by a central portion or inner end portion 35 which is of enlarged configuration and which is formed with a slot 36 therethrough extending transversely of the end or finger portions 34. As clearly seen in Figure 3, the pairs of holes 31 and 30 are radially offset about the axis of the cylinder 16. Also, as shown in Figure 3, the crank pin 18 is freely slidable in all of the slots 36 of the central portions 35. In view of the fact that the crank shaft 17 and crank pin 18 are stationary relative to the cylinder 16, the action of the crank pin 18 in the slots 36 causes the beater fingers 33 to be reciprocated in the pairs of holes 30 and 31 without any oscillatory movement. Oscillatory movement is further prevented by the engagement of the lugs 32 with opposite edges of the end portions 34 of the fingers 33. Thus, the end portions 34 of the beater fingers are alternately projected and retracted through the holes 30 and 31 at like points in each revolution of the cylinder. In the embodiment illustrated, Figure 2, the beater fingers 33 are moving in the directions of the arrows as the cylinder rotates in the direction of the broken arrow. Thus, as the beater finger leaves the uppermost point on each revolution, it begins to be projected outwardly of the cylinder 16 until it reaches the lowermost point at which time it begins to be retracted, such retraction continuing until it reaches the uppermost point. In view of the fact that each beater finger comprises actually two finger portions 34, one of such portions is always being retracted while the other is always being projected. Obviously, single instead of double beater fingers could be employed. To vary the phase of the projection and retraction of the beater fingers, it is only necessary to loosen the nut 25 on the stud 24, whereby the adjusting arm 22 may be swung concentrically of the crank shaft 17 so as to move the crank pin portion 18 thereof adjustably concentrically of the axis of the cylinder 16. The effect of this is to cause the projection and retraction of the beater fingers at points other than the high and low points in the revolution.

Instead of the sectional cylinder just described, it is obvious that a seamless cylinder 39, Figure 5, may be provided and formed with beater finger holes 40 and 41 therethrough corresponding to the holes 30 and 31 aforesaid.

Figure 8 discloses a further modified form of cylinder and also a modification of the beater fingers. As there disclosed, each beater finger 43 comprises a pair of finger portions 44 and an inner end 45. The inner ends 45 are formed with opposed recessed surfaces 47 which cooperate to provide a slot 46 when the two finger portions 44 are connected together in butt-to-butt relation by any suitable connector means, such as the machine screws 48. This form of the invention is readily applicable to cylinders such as the seamless cylinder 39 or the cylinder 49 shown in Figure 8. Such cylinder 49 may be seamless and be provided with oversized beater finger holes 50 in which are seated removable sleeve bearings 52 for guiding the finger portions 44 for reciprocation in straight lines. The bearings 50 may be secured in place in any suitable manner, as by the machine screws 53.

In all forms of the invention, the operation of the device is the same, in that the beater fingers are reciprocated in straight lines so as to permit a close sliding fit in the beater finger holes 30 and 31 or like holes. Thus, foreign matter is prevented from entering the interior of the beater cylinders and also the noise incident to the usual oscillating type of beater fingers is eliminated by the arrangement shown which permits reciprocation of the beater fingers in straight lines.

Thus, while I have shown and described what is now thought to be a preferred embodiment of the invention, it is to be understood that the same is susceptible of other forms and expressions. Consequently, I do not limit myself to the precise structure shown and described hereinabove except as hereinafter claimed.

I claim:

1. A rotating beater for combines comprising a crank shaft, a hollow cylindrical body rotatably mounted on the opposing ends of the shaft and encompassing the throw portion of the shaft, said cylindrical body having diametrically aligned openings formed transversely to the side wall thereof, elliptical shaped mounting members disposed on the throw portion transversely of the longitudinal axis thereof, beater fingers projecting outwardly from the opposing sides of each mounting member and disposed in axial alignment, said fingers of each member being slidably disposed through the associated pair of aligned openings and being alternately projected and retracted through the associated pair of openings in a rectilinear path of movement.

2. A rotating beater for combines comprising a crankshaft having a throw portion, a hollow cylindrical body rotatably mounted on the opposing ends of the shaft and encompassing the throw portion of the shaft, said cylindrical body having diametrically aligned pairs of openings formed transversely through the side wall thereof, elliptical shaped mounting members disposed on the throw portion transversely of the longitudinal axis thereof, beater fingers projecting in opposite directions from each of the mounting members and disposed in axial alignment, said fingers of each member being slidably disposed through the associated pair of openings and being alternately projected and retracted through the associated pair of openings in a rectilinear path of movement, in response to the rotary movement of the cylindrical member.

JOHN JOHNSON.

REFERENCES CITED

The following references are of record in the file of this patent:

UNITED STATES PATENTS

| Number | Name | Date |
|---|---|---|
| 70,032 | Shirley | Oct. 22, 1867 |
| 252,905 | Schultz | Jan. 31, 1882 |
| 259,427 | Sample | June 13, 1882 |
| 524,264 | Neal | Aug. 7, 1894 |
| 816,067 | Boettler | Mar. 27, 1906 |
| 1,116,113 | Piper | Nov. 3, 1914 |
| 2,366,238 | Clausen | Jan. 2, 1945 |